US005550932A

United States Patent [19]

Blaylock et al.

[11] Patent Number: 5,550,932
[45] Date of Patent: Aug. 27, 1996

[54] METHOD FOR ENCODING MICR DOCUMENTS

[75] Inventors: Thomas F. Blaylock, Irvine; Marvin C. Schroeder, Mission Viejo, both of Calif.

[73] Assignee: Pierce Companies, Inc., Santa Ana, Calif.

[21] Appl. No.: 901,403

[22] Filed: Jun. 19, 1992

[51] Int. Cl.⁶ .................................................. G06K 9/00
[52] U.S. Cl. ............................................ 382/139; 235/462
[58] Field of Search ............................... 382/7, 29, 11, 382/64, 61, 139, 137, 182, 307, 320; 235/462, 449, 376, 463; 380/23, 31

[56] References Cited

U.S. PATENT DOCUMENTS

| | | | |
|---|---|---|---|
| 3,949,363 | 4/1976 | Holm | 382/7 |
| 4,461,028 | 7/1984 | Okubo | 382/7 |
| 4,531,231 | 7/1985 | Crane et al. | 382/61 |
| 4,589,144 | 5/1986 | Namba | 382/61 |
| 4,660,221 | 4/1987 | Dlugos | 382/1 |
| 4,845,348 | 7/1989 | Ho et al. | 235/449 |
| 5,188,464 | 2/1993 | Aaron | 235/462 |
| 5,199,081 | 3/1993 | Saito et al. | 382/61 |

*Primary Examiner*—Joseph Mancuso
*Attorney, Agent, or Firm*—Price, Gell & Ubell

[57] ABSTRACT

A method is provided for automatically printing a unique serial number on MICR documents wherein the serial number may be used to identify the source of the document. If problems occur during subsequent processing of the document, the serial number may be decoded to identify the source of the document for repair, etc., or to identify the source of printing fraudulent checks or if the document was printed on stolen equipment. The unique codes are preferably embedded within character fonts used to print the MICR documents. In this manner, no further modification to MICR printing systems is required. Rather, by modifying MICR fonts to each include a unique serial number, the serial number is automatically printed on all documents printed using the font.

2 Claims, 3 Drawing Sheets

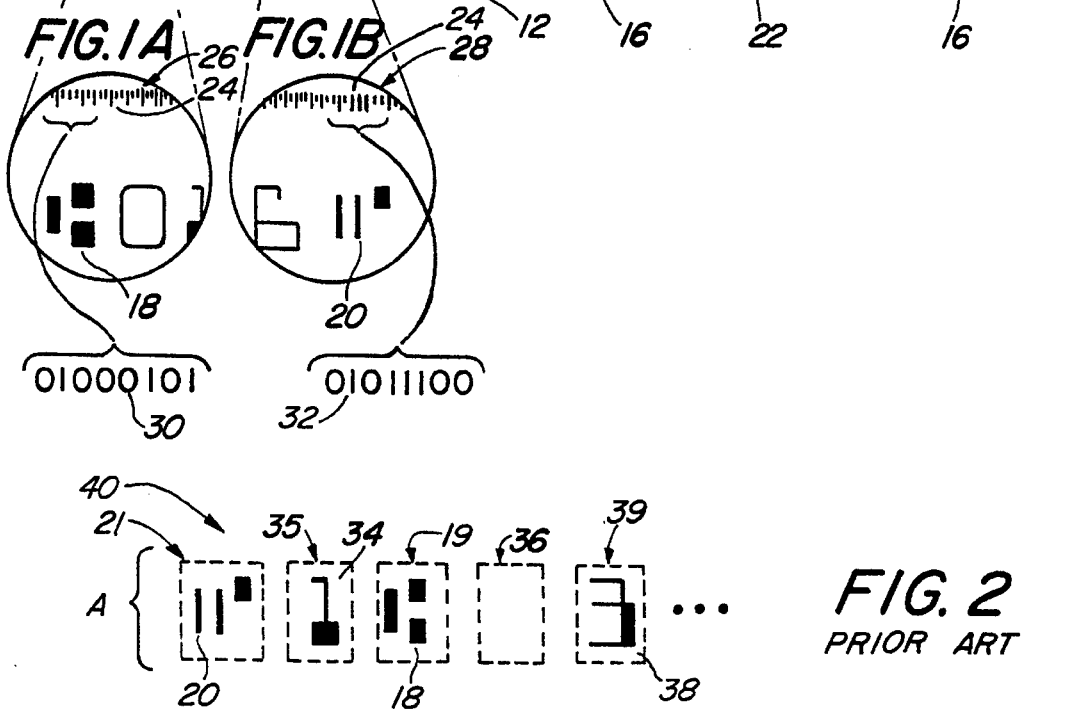
FIG. 1
FIG. 1A  FIG. 1B
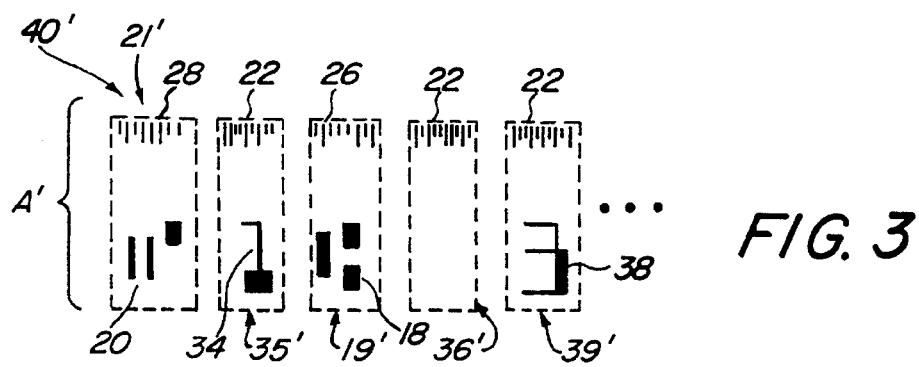
FIG. 2
PRIOR ART
FIG. 3

METHOD FOR ENCODING MICR DOCUMENTS

BACKGROUND OF THE INVENTION

1. Field of the Invention

The invention generally relates to MICR documents and, in particular, to a method for tracking the source of the MICR encoded documents.

2. Description of Related Art

Magnetic ink character recognition (MICR) codes are commonly used on financial documents such as checks, loan coupons, travelers checks, bonds and the like. The MICR codes are printed on the checks by various methods. Currently, the majority of the checks printed are done on litho or offset presses with liquid ink which has iron oxide mixed into it. The usage for these checks is predominantly checkbooks, preauthorized payment checks, and travelers checks, along with other applications like payroll checks. Within the last few years, however, there has been a growing trend in the use of computer-driven impact and nonimpact continuous form and page printers to print the MICR codes, as well as other data on checks and financial documents. Although not limited to these computer-driven printers, it is mainly in this area that this invention will be used. Impact printers mostly use a carbon film ribbon with iron oxide mixed in it to print with. Nonimpact page and continuous form printers use toner or thermal ribbon with iron oxide mixed in it to print MICR codes. When the MICR codes are read utilizing a magnetic character reader, the iron oxide (ferrite) is magnetized. When the code is passed by a read head, a magnetic wave form or signature is produced which identifies the particular code being read. The MICR codes facilitate automatic reading and processing of the documents by automatic readers. Such readers can read up to 100,000 documents per hour. The font of the MICR codes is controlled by standards which cannot be deviated from.

Occasionally, automatic MICR readers have difficulty reading the MICR code of a particular document. Most often, the rejected document has been produced on a nonimpact printer which is either out of adjustment or is using a poorly designed or programmed MICR font. Unfortunately, conventional MICR documents include little or no information allowing one to determine the source of the MICR code placed on the document to thereby allow the defective MICR printer to be identified and corrected. The conventional MICR encoded documents may provide some information regarding the bank or other business organization which initially authorized the document. However, such information is frequently insufficient to quickly and accurately determine the actual source that printed the MICR code on the document. This problem becomes particularly intractable where the issuing bank or other business organization may have contracted any of a number of document printing companies to print the documents. Furthermore, it has become feasible to print MICR documents using a laser printer supplied with magnetic ink toner, rather than using a conventional dedicated MICR printer. MICR documents printed with such laser printers have a fairly high incidence of subsequent processing errors.

Occasionally, fraudulent financial documents are created by persons using NIP (nonimpact) printers without proper authorization, or using stolen font cards, soft fonts, or MICR printers. Currently, no convenient method is available for determining whether any particular MICR document was printed by a stolen MICR printer or printed using a stolen MICR character font card or MICR character font. The ability to make such a determination would greatly facilitate the identification of counterfeit or unauthorized MICR documents. Because of the worldwide standards governing the MICR codes, no other indicia or marks of any kind have been imbedded in the MICR cell, as the MICR reader would attempt to read it if it were in the clear band and it would result in a reject. However, the subject invention assures that any marks, codes, etc., would be printed out of the clear band and would not affect the document readability.

SUMMARY OF THE INVENTION

It is an object of this invention to provide a method for determining the source of MICR printed documents in order to quickly and efficiently locate defective or improperly programmed MICR printers or to identify counterfeit or unauthorized MICR documents.

This object and the general purpose of the invention may be achieved by providing character cells having MICR codes where selected character cells include portions of an identifying code associated therewith, the identifying code being automatically printed on a document by a MICR printer whenever the selected character cells are printed onto the document. The identifying code associated with the selected character cells provides a unique serial number which preferably designates either the MICR printer used to print the document or the MICR character font used by the printer.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 1 illustrates an exemplary check having embedded identifying codes shown in enlarged sections;

FIG. 2 illustrates example MICR character cells from a conventional prior art MICR character font;

FIG. 3 illustrates examples of characters from a MICR character cell of the invention, with two of the exemplary character cells having an identifying code embedded therein;

DESCRIPTION OF THE PREFERRED EMBODIMENTS

Figure 5:
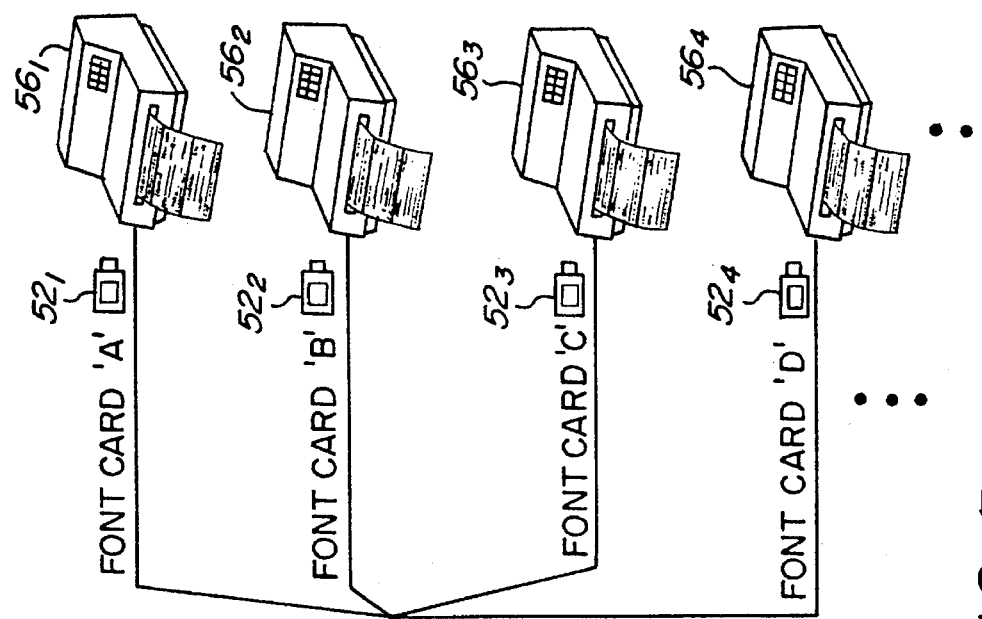
FIG. 5 is a block diagram, somewhat in schematic form, illustrating a system for generating unique character-cell sets and for printing MICR documents using the unique character-cell sets.

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide a method for serially encoding MICR documents.

This paragraph defines terms used in the specification. According to the prior art, each "MICR cell" may comprise a "MICR code" (having a "MICR font") and a "clear band" located above the MICR code. The "character cells" of the present invention are similar to the prior art MICR cells (having MICR codes and clear bands), but each character cell may further comprise a "binary code" located above the clear band, for example. These character cells are thus taller than conventional MICR cells. Each character cell may be formed of a "pixel grid." The binary codes of some of the character cells may not convey useful information, while the binary codes of other character cells may comprise portions of an "identifying code." The identifying code associated with the selected character cells provides a unique serial number which preferably designates either the MICR printer used to print the document or the MICR character font used by the printer. Each identifying code is unique to a set of character cells (a "character-cell set") printed by a unique printer.

In accordance with a preferred embodiment, a collection of character-cell sets is provided. Each character-cell set includes MICR codes and a unique encoded serial number identifying the character-cell set. Each customer or organization purchasing or using a MICR printer is provided with a character-cell set having a unique serial number encoded therein. A master list is maintained which sets forth each of the issued serial numbers and the identity and location of the customer or organization to whom the character-cell set was issued. The character cells with the unique serial numbers associated therewith may be provided on a font card which is either mailed to a customer or provided with a new MICR printer; the character-cell sets may be transmitted over the telephone line, using a modem; the character-cell sets with serial numbers could be resident in the printer electronics; or just the serial number character cells could be resident in the printer electronics, to be activated when the character-cell set is loaded.

The serial number is written in a visually unobtrusive binary code, possibly represented by a set of vertical short and long dashes, with short dashes representing binary zeroes and long dashes representing binary ones. To ensure that the binary code does not interfere with normal automatic reading of the MICR codes themselves, the binary code is printed outside of the clear band in which the MICR codes are printed. By referring to the base line, the MICR codes positioned on the document remain unaltered with respect to the ANSI standards.

By associating the binary codes with certain character cells, the codes are automatically printed without requiring any other modification to the MICR printers or printing processes. In other words, by storing the binary codes directly within the character cells, the codes are automatically printed onto a document whenever MICR codes are printed. No additional printing steps are required to print the binary codes. The binary codes are printed automatically in a manner which does not affect other aspects of the process of printing MICR documents. Indeed, the organization or company printing a MICR document need not even be aware that binary codes are being automatically printed on the documents.

To ensure that the binary codes are printed outside of the MICR clear band, each of the individual character cells is taller than a standard MICR cell. That is, the pixelated grid which defines each MICR cell is taller than defined by the standard. The size and shape of the actual MICR code provided within the character cell is unchanged. Rather, the character cell is expanded to include extra blank space. The binary encoded serial number is included along a top edge of the character cell. Only selected character cells may have the binary code included therein.

The encoded serial number may be included in several selected character cells, with each character cell having only a portion of the binary code. In this manner, a lengthy binary code need not be fitted within only a single character cell. To ensure that the binary codes are always automatically printed whenever MICR codes are printed, the selected character cells should be ones which are always printed in any MICR document. To this end, character cells having the MICR "TRANSIT" and "ON-US" codes are preferably selected for receiving portions of the binary code. Of course, any of the character cells can be provided with a binary code, the only requirement being that the character cells are chosen such that the binary code will always be printed, regardless of the specific sequence of MICR codes that are printed.

To remain unobtrusive, binary codes are preferably printed at the smallest possible resolution to allow reliable subsequent reading with the aid of a magnifying glass or the like. To further ensure that the binary codes are unobtrusive, all the character cells in the character-cell set are provided with a binary symbol. To the untrained eye the binary symbols combine to form what appears to be a simple, decorative border. Preferably, only two MICR codes are selected for receiving the actual binary encoded serial number. The selected character cells may include the TRANSIT code and the ON-US code.

All the character cells receive binary symbols in the form of short and long vertical dashes. The vertical dashes provided to the character cells not receiving a binary encoded number may be randomly assigned. The serial number can be read by decoding the binary code above the selected character sets.

Alternatively, the true binary encoded serial number may be repeated in all the character cells. Even in such a case, the resulting border of short and long dashed lines will appear random to the untrained eye.

Although a simple binary code consisting of short and long vertical segments is preferred, any of a wide number of encoding schemes may be employed. For example, the code may consist of dots or other symbols. Alternatively, the code need not be binary. Indeed, the code need not encrypt the serial number in any way. For example, the serial number of the particular character-cell set or MICR printer could merely be provided in Arabic numerals. However, a simple binary code is preferred, since a more complicated code or a set of Arabic numerals may be difficult to read if the MICR printer printing the document becomes defective.

Although described with reference to character cells having MICR codes and to the printing of MICR documents, the techniques of the present invention can be applied to a wide variety of other documents and other printing systems to provide a method for tracking the source of a printed document. Any printing system employing manufacturer-provided fonts may benefit from the invention. Also, although modification of printing fonts (character-cell sets) is a preferred means for implementing the invention, suitable binary codes may be provided on documents such as checks and bonds by modifying the print programs, rather than by modifying the print fonts. The invention may be used for offset and impact printing, but is most easily implemented using NIP technology such as thermal, ink jet, and toner-type devices.

Referring to the figures, specific embodiments of the invention will now be described. FIG. 1 illustrates a check 10 of conventional design having a MICR code string 12 along a lower edge of the check. MICR code string 12 is provided within a clear band identified by numeral 14 having a height of about ⅝-inch. MICR code string 12 is composed of a number of individual MICR codes 16, each having conventional size, shape, and spacing. MICR code 16 may be Arabic numerals such as "012578," etc., or may be special MICR control codes such as a TRANSIT code 18 or an ON-US code 20.

Collectively, the MICR code string provides banking information in a coded format to facilitate automatic processing of check 10. All portions of check 10 are entirely conventional, except for the inclusion of an encoded border 22 provided just above the MICR clear band along the entire length of the check. Border 22 is a pattern of short and long vertical dashes extending above all of the MICR codes, including blank spaces within the MICR code string. As shown by the insets in FIG. 1, portions of border 22 over TRANSIT code 18 and ON-US code 20 include a binary code 24. Binary code 24 is composed of a specific sequence of one or more series of vertical long and short dashes. Code 24 may comprise one continuous sequence of short and long dashes or, as shown, may be broken into two or more segments over separate characters, each containing a portion of a binary code.

In the embodiment of FIG. 1, a first portion of code 24, identified by reference numeral 26, is found along a left end of border 22 above TRANSIT code 18. A second portion 28 is provided at an intermediate point along border 22 above ON-US code 20. The short and long dashes positioned over the nonselected codes, specifically all codes other than the TRANSIT code and the ON-US code, may be provided with a random sequence of dashes. The dashed lines of the selected character sets and those of the remaining character sets together provide the appearance of a continuous, decorative border. In this manner, the presence of code 24 is substantially unnoticed by an unaided or untrained eye. Preferably, the long segments of binary code 24 have a height of slightly less than 0.014 inch, and the short segments have a height of approximately 0.007 inch.

Binary code 24 preferably provides a coded serial number uniquely identifying the printer utilizing the character-cell set used to print check 10. The identity of the organization or individual printing the check or the identity of the MICR printer is known on the basis of the unique code associated with the character-cell set used in printing the check.

The binary code segment 24 shown in FIG. 1 may be decoded by representing each short line segment as a binary 0, and each long line segment as a binary 1, as shown by binary string sequences 30 and 32. In the example of FIG. 1, first portion 26 of binary code 24 represents the binary sequence "01000101." Second portion 28 of binary code 24 represents binary string "0101100." This binary string may be converted to base 10, yielding "17756," which may represent a sequentially-generated serial number identifying this particular character-cell set or a particular printer. Preferably, all checks prepared by a single source will have this same serial number. Each different source of MICR documents is provided with a different character-cell set having a different serial number. By decoding the binary code of a particular check and comparing it with a master list of all issued serial numbers, the source of the MICR document can be determined.

Consistent with the invention, many different schemes of identification are possible. For example, a unique serial number may be assigned to each individual MICR printer or to each character-cell set used by MICR printers. Alternatively, a unique serial number may be assigned to each organization, such as a company or corporation, which uses MICR printers to print MICR documents.

As in the embodiment shown in FIG. 1, the serial number may be converted to binary, then encoded by short and long dashed lines embedded within a border immediately above the MICR clear band. If preferred, the encoded serial number could be further encrypted to make it more difficult to alter. However, a wide variety of other encoding techniques may be employed. For example, the serial number may be merely printed in base 10 Arabic numerals within border 22. Alternatively, an alphanumeric text string identifying the source of the MICR document may merely be provided somewhere on the check. No border need be provided. Further, the identification of source need not be printed immediately beyond the free band. Indeed, the code may be printed anywhere on the check or other legal document, preferably in locations which do not interfere with other text portions of the check.

The code is preferably printed just above the MICR clear band, as that location allows for a particularly efficient method for implementing the printing of the code, which will now be described with reference to the remaining figures.

In FIG. 2, exemplary conventional MICR codes are provided. The MICR codes are provided within a MICR-cell set 40 wherein each individual symbol is defined within a rectangular pixel grid having a height A. FIG. 2 provides five exemplary MICR cells, including TRANSIT code 18 defined by pixel grid 19, Arabic numeral "1" identified by reference numeral 34 and defined within pixel grid 35, ON-US code 20 defined within pixel grid 21, "blank" space defined by pixel grid 36, and Arabic numeral "3" identified by reference numeral 38 and defined by pixel grid 39. The MICR-cell set 40 includes one MICR cell for each printable MICR code and one MICR cell for blank space 36. Each MICR cell comprises a rectangular grid of pixels typically having a width of 0.125 inch and a height somewhat greater than the width. At 300 DPI, each dot or pixel of the pixel grid is a square having a side with length 0.0033 inch. Hence, each conventional MICR cell has a width of approximately 38 pixels and a somewhat greater height. Each individual MICR code is rendered within the pixel grid by "filling in" some of the pixels.

The preferred method of implementing the present invention is to provide a modified character-cell set 40', a portion of which is represented in FIG. 3. As with conventional MICR-cell sets 40, each code is defined within a generally rectangular pixel grid. However, each code of the modified character-cell set is considerably taller than a conventional MICR cell. The height of each character cell is represented in FIG. 3 by A'. Rather than having a height only somewhat in excess of 0.125 inch, the character cells of the character cells of the invention have a height of approximately 0.339 inch. In addition to having a taller pixel grid, each character-cell set includes not only a MICR code, but either a portion of binary code 24 or a portion of random dashes embedded therein. In other words, each modified character cell includes a conventional MICR code in its bottom portion and either a portion of the binary code or a portion of the border pattern defined within a top portion of the grid.

Figure 4:
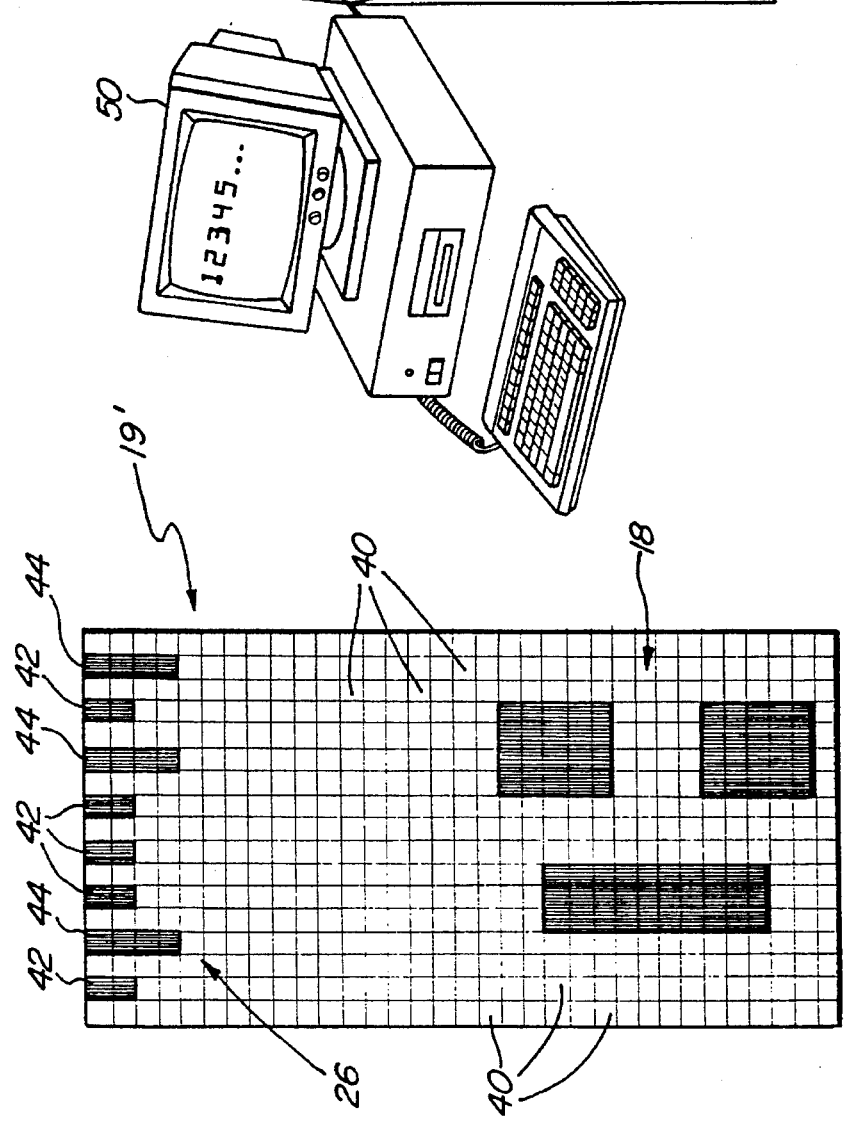
FIG. 4 illustrates a pixel grid which defines a single character cell.

FIG. 4 provides an expanded view of a single character cell provided in accordance with the invention. As can be seen from FIG. 4, a MICR code, such as TRANSIT code 18, is rendered in the lower portion of the pixel grid, and portion 26 of binary code 24 is rendered along an upper edge of the pixel grid. As with a conventional MICR cell, each pixel of each character grid has a size of about 0.0033 inch. The modified pixel grids therefore have a width of about 37 pixels and a height of about 160 pixels. For clarity, the character cell shown in FIG. 4 has a lesser width and a lesser height. In other words, not all columns and rows of the pixel grid of a preferred modified character cell are fully shown in FIG. 4.

Each dash of binary code 24 may be one pixel wide, as shown, or wider if desired. In the example of FIG. 4, each short dash of binary code 24 is two pixels tall and each long dash is four pixels tall.

By embedding portion 26 of binary code 24 directly within TRANSIT code 18, portion 26 of binary code 24 is automatically printed whenever TRANSIT code 18 is printed. Hence, the binary code is automatically printed without requiring any modification to the MICR printers or to the programs implementing the printers. Preferably, portions of the binary code are embedded within character cells which are printed on every MICR document, that is, codes which appear in every MICR code string. The TRANSIT and ON-US codes are preferably used, since these codes substantially always appear on every MICR document. All other codes in the character-cell set may be provided with random vertical dashes along their top edge. By providing all codes of the character-cell set with either a binary code or random dashes, any document printed with a MICR code will have a border along the entire length of the MICR code string. The border will always include one or more segments which include the complete binary code. Rather than assigning random sequences of short and long vertical dashes to codes other than the TRANSIT and ON-US codes, these other codes may be provided with the same binary code appearing in the TRANSIT and ON-US codes. Even with the same code, border 22 will have the appearance of a random sequence of short and long dashes.

As noted above, the modified character cells are defined within pixel grids which are considerably taller than conventional MICR cells to ensure that the vertical dashes are printed outside of the MICR clear band on the document. If conventional-sized MICR cell grids were employed, any codes embedded therein would likely be printed within the MICR clear band and interfere with normal automated processing of the MICR codes. Typically, the MICR band has a height of 0.625 inch. Each MICR code has a height of 0.117 inch and is printed with a lower edge of the code positioned 0.187 inch above the bottom of the clear band. Accordingly, there is approximately 0.325 inch between the bottom of each MICR code and the top edge of the clear band. Providing character cells having a height greater than 0.325 inch allows the vertical dashes to be embedded within the character cell, yet printed above the MICR clear band.

To ensure that most MICR documents receive a binary code, every source of MICR documents should be provided with a modified character-cell set. This may be achieved by upgrading each existing MICR printer with a unique character-cell set and by ensuring that each new MICR printer is provided with a unique character-cell set. The MICR character-cell set may be provided on font cards or may be merely transmitted over telephone lines using a conventional modem, or may be resident in the printer electronics.

FIG. 5 provides an illustration of a system by which modified character-cell sets can be created and used. Each unique character-cell set is created on a conventional computer 50 using one of a number of conventional font-generating programs. Each unique character-cell set is created by first assigning a unique serial number to the character-cell set. The serial number is converted to a binary bar code. The binary bar code is rendered within the selected character cells along top edges of the pixel grids. Finally, random vertical dashes are provided on all remaining character cells in the character-cell set or, alternatively, the binary code is simply repeated for all the remaining character-cell sets.

Once each unique character-cell set is created, it may be written onto a font card, generally denoted 52, by any appropriate font card-generating device (not shown). A complete set of different font cards, each having a unique character-cell set, is thus generated. In FIG. 5, the unique font cards are identified $52_1$, $52_2$, $52_3$, $52_4$, etc. Each font card is mounted within a MICR printer, generally denoted 56, which automatically prints all MICR documents using the modified character-cell set. The binary code is automatically printed whenever the selected character cells of the character-cell set are printed, without any modification of MICR printers 56. The invention has been described in connection with the EIB-B standard. But the invention has equal application with CMC7 or OCR applications.

Figure 6:
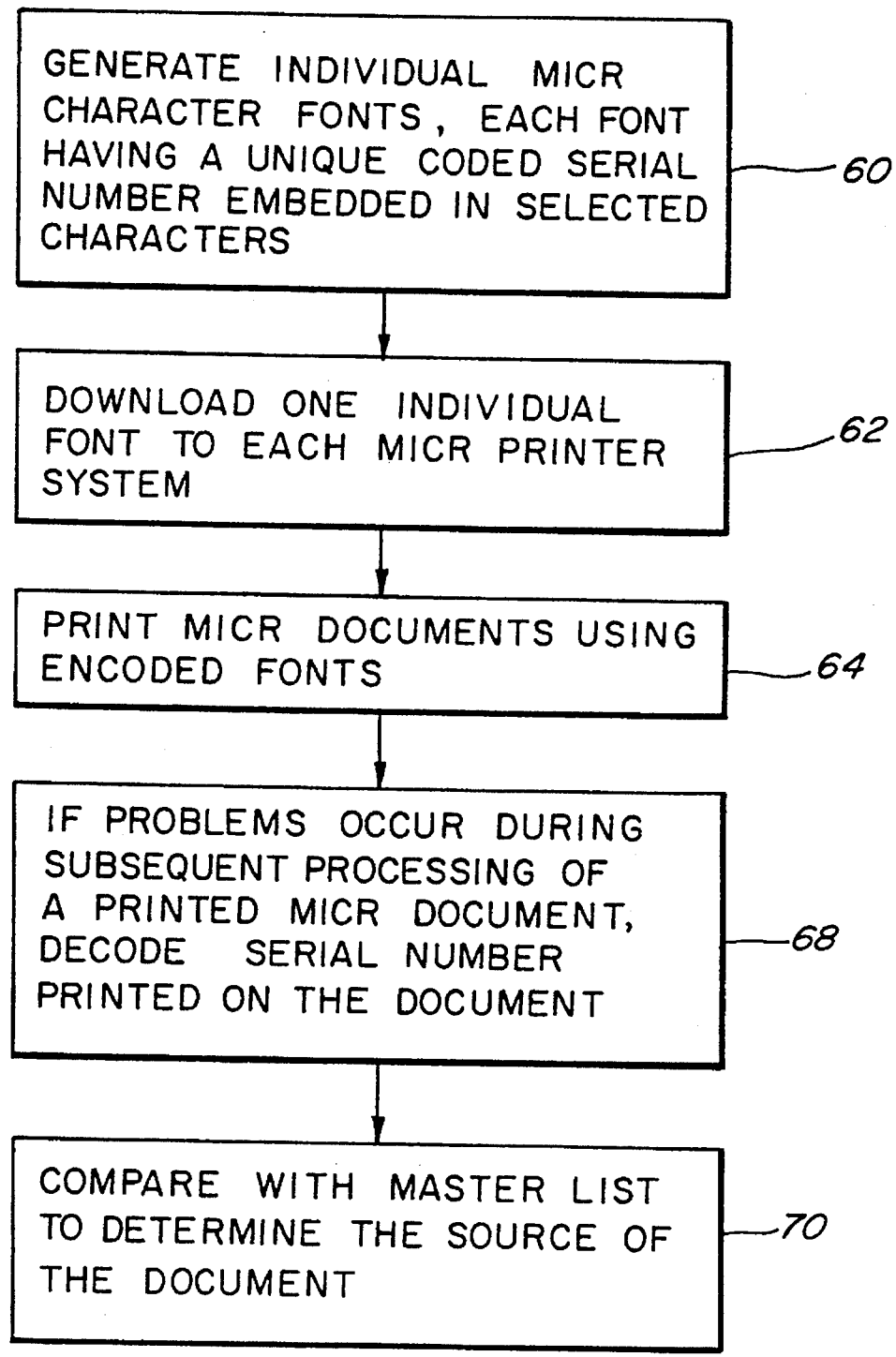
FIG. 6 sets forth a method, in flow chart form, for generating and using the character cells of the present invention.

The method for implementing the invention is shown in FIG. 6. In first step 60, a unique character-cell set is generated which includes a binary code embedded within selected character cells.

At second step 62, each unique character-cell set is downloaded to a respective MICR printer system. At third step 64, MICR documents are printed using the modified character-cell set.

At step 68, should a MICR automatic reader have difficulty reading a particular MICR document, the document is examined to retrieve the binary code printed thereon, which is then converted to a base 10 serial number. Finally, at step 70, the serial number is compared with a master list of all issued serial numbers. In this manner, the source of the particular document is determined and the malfunctioning MICR printer identified for correction.

Also, if a particular MICR document is suspected of being unauthorized, the binary code imprinted thereon can be decoded to yield the corresponding serial number, which may be compared with a list of serial numbers of stolen MICR printers or character fonts, to thereby allow verification that the document is counterfeit.

If a host computer must use a single character-cell set to download to multiple printers, then each printer could be assigned a unique serial number stored in the printer electronics. The printer electronics would then add the encoded serial number to the character-cell set that was sent from the host computer.

To obtain a higher security implementation, the same serial number could be assigned to the printer and the character-cell set. The serial number resident in the printer and the serial number resident in the character-cell set could be encoded or encrypted. When the character-cell set with its serial number is downloaded to a printer, the printer compares its serial number with the one associated with the character-cell set just received. The printer will not allow MICR printing if the serial numbers do not match.

What has been described is a system for providing a unique serial number on all MICR documents wherein the serial number identifies the source of the character-cell set on the document. The code is preferably embedded within character cells used to print MICR documents. No modification to MICR printing systems is required.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A method for providing a printed identification of the source of a magnetic ink character recognition (MICR) printed document printed by a printer using a character-cell set, said identification being printed directly on said document comprising:

for each source of a printed document, providing a unique character-cell set having a set of character cells for printing onto a document wherein at least one of said character cells has binary code, defined by a series of long and short parallel lines arranged in a row, included therein which uniquely identifies the said character-cell set used by a MICR printer in printing the document;

downloading said character-cell set to a printer;

selecting character cells from said character-cell set for printing onto a document, said selected character cells including at least one character cell having the binary code; and printing said selected character cells onto a document, such that the binary code is also automatically printed.

2. A method for providing a printed identification of the source of a magnetic ink character recognition (MICR) printed document printed by a printer using a character-cell set, said identification being printed directly on said document comprising:

for each source of a printed document, providing a unique character-cell set having a set of character cells for printing onto a document wherein at least one of said character cells has binary code, defined by a series of long and short parallel lines arranged in a row, included therein which uniquely identifies a MICR printer used in printing the document;

downloading said character-cell set to a printer;

selecting character cells from said character-cell set for printing onto a document, said selected character cells including at least one character cell having the binary code; and printing said selected character cells onto a document, such that the binary code is also automatically printed.

* * * * *